July 12, 1932.  M. H. BENNETT  1,867,131
METHOD OF AND APPARATUS FOR TESTING CONDENSERS
Filed May 24, 1929
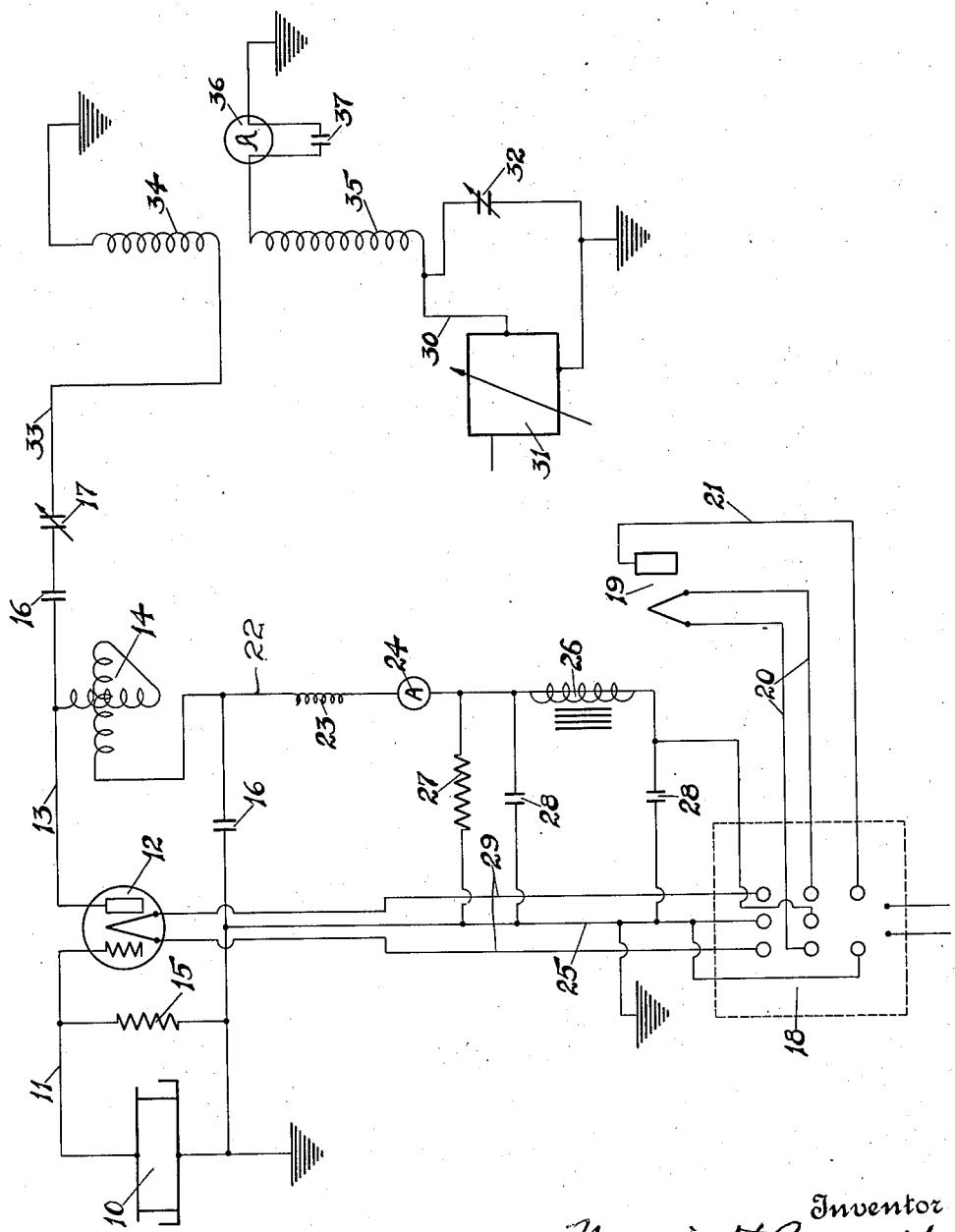
Inventor
Morris H Bennett
By his Attorneys Patented July 12, 1932

1,867,131

UNITED STATES PATENT OFFICE

MORRIS H. BENNETT, OF WATERBURY, CONNECTICUT, ASSIGNOR TO SCOVILL MANUFACTURING COMPANY, OF WATERBURY, CONNECTICUT, A CORPORATION OF CONNECTICUT

METHOD OF AND APPARATUS FOR TESTING CONDENSERS

Application filed May 24, 1929. Serial No. 365,645.

This invention relates to a method of and apparatus for testing electrical condensers.

It is an object of this invention to provide a method and apparatus whereby electrical condensers of the variable type, for instance, of the type used for radio receiving apparatus, may be simply, quickly and accurately tested.

With this general object and others in view, the invention consists in the method, features, combinations, details of construction and arrangements of parts which will first be described in connection with the accompanying drawing and then more particularly pointed out.

In the drawing, the single figure is a schematic and diagrammatic view of apparatus constructed and arranged in accordance with the invention.

In manufacturing condensers for radio use, it is important that all of the condensers having a similar range of capacity have corresponding capacity values for corresponding dial settings so that if desired, they may be used as "gang" condensers on a common condenser shaft as is the practice today when providing radio sets with one dial control, or if used as single units the dial markings may be the same so that the condensers may be interchangeable.

In accordance with the method herein disclosed, a series of strong high frequency oscillatory currents are generated such that one is of fundamental frequency and the others constitute a number of higher harmonics of said fundamental. These high frequency currents are impressed on a tuned circuit of which the condenser under test forms the capacity element. The value of the inductance of this tuned circuit is so chosen that the known higher harmonics produce a condition of resonance in the tuned circuit at a plurality of suitably separated points within the range of the scale of the condenser under test. Resonance is indicated by a suitable instrument, such as a current indicator, ammeter or the like, included in the tuned circuit.

Knowing then the points on the condenser scale of a perfect condenser at which the harmonics ought to produce resonance, it is only necessary to turn the condenser dial to these points, and, if the condenser is properly constructed, resonance at these points will result and will be indicated by the readings of the ammeter, or like indicator.

In practice, in testing a plurality of condensers, the condensers are inserted one after another in the tuned circuit and the dial is moved to the settings previously determined where resonance should occur. If a condenser is accurate, the ammeter should indicate a condition of resonance at each setting. If it does not, the condenser should be turned in one direction or the other until resonance is shown by the ammeter, and the variations of the dial setting from that predetermined or ideal will indicate the error.

Referring to the drawing, the invention in its entirety includes means for generating currents of fundamental frequency and higher harmonics of said fundamental. Although capable of various arrangements, in that shown by way of example, such means embody an oscillation generator employing a piezo-crystal for maintaining the fundamental frequency constant.

In this exemplification, an oscillating piezo-crystal 10 is located in the grid circuit 11 of a suitable three-element tube 12. The plate circuit 13 is provided with inductance, in this case, a variable inductance 14 which allows tuning of the plate circuit. The inductance is set at a point where the higher harmonic currents are generated the strongest. In shunt across the grid is a resistance 15 of approximately two megohms for the purpose of maintaining the grid potential constant. In the plate circuit, a fixed condenser 16 and a variable condenser 17 are located. The fixed condenser serves to insulate the high voltage from the operator and the variable condenser to control the output circuit.

The oscillation generator described differs from the oscillators generally employed in that it is purposely constructed to give not only a current of fundamental frequency but also accompanying higher harmonic currents of appreciable strength, a construction hitherto always avoided with such oscillators.

Means are provided for supplying filament and plate currents to the tube. In the arrangement shown by way of example, a transformer 18 is employed. The primary winding of the transformer is energized from A. C. mains. One secondary winding of the transformer supplies the filament of a two-element rectifying tube 19 through leads 20. Plate circuit 21 of the rectifying tube is connected to one end of a secondary winding so as to produce a rectified current. The circuit for this rectified current extends over conductor 22 through choke coil 23 which prevents passage of undesirable A. C. current to the plate circuit of the three-element tube in the oscillation generator, an ammeter 24 being conveniently placed in the circuit for indicating the current. The other side of the circuit of the rectified current extends from the other side of the transformer winding over conductor 25 to the opposite side of the plate circuit of the tube. Series inductance 26, and shunt resistance 27 and capacity 28 are provided across the leads of the rectified or D. C. current to further filter and absorb undesirable discharges. The filament of the three-element tube is supplied from the transformer through leads 29. A center tap for this winding is grounded for the return circuit, such grounding being conventional practice.

The invention in its entirety also involves means for impressing the composite wave produced by the oscillation generator on a circuit including the condenser under test. Such circuit is a series circuit indicated by numeral 30 and the condenser under test by numeral 31. A variable condenser 32 is advantageously arranged in the circuit in shunt with the condenser under test in order to permit the use of piezo crystal having different frequency characteristics. In arrangements embodying the invention to what is now considered the best advantage, the oscillator output circuit is inductively coupled to the circuit of the condenser under test. In this exemplification, a conductor 33 leads from the oscillator through the primary winding 34 of an induction device to ground. The secondary winding 35 of said device is loosely coupled to the primary winding and is included in series in the circuit of the condenser under test. Such circuit also includes a resonance indicating device, conveniently a current indicator, such as a thermo-galvanometer 36 having a fixed shunt condenser 37.

In the practice of the invention, the generator is adjusted to give strong currents of fundamental frequency and higher harmonics of said fundamental frequency. This is conveniently achieved by inductance 14, as already explained. The coils of the inductance device 34, 35 are then selected at a value such that the circuit including the condenser under test will be resonant for about three or four of the currents, the points selected being such as to fall within the range of the condenser and substantially equally spaced over said range. If, when the condenser is moved so that its dial registers these frequency points, the galvanometer gives an indication of resonance within the allowable commercial tolerance or error, the condenser is acceptable. If outside the tolerance limits, the condenser should be rejected, and returned for adjustment and retested.

The harmonics impressed on the condenser circuit simulate reception from broadcasting stations of the same known frequencies. The condenser is, in a sense, tuned to such stations and the error in tuning noted. What is actually done is that the condenser is turned to those points on its dial where resonance should occur for the frequencies of the harmonics and the deviations in resonance from said points observed. If such deviations are within the permissible tolerance limits, the condenser is acceptable, otherwise, it is not.

Resonance is noted by the galvanometer or other current indicating device. The galvanometer should give its maximum reading where resonance occurs. The harmonics and inductance coils 34, 35 should preferably be so selected that, for convenience, the resonance readings will be substantially the same at all points used.

If it is desired to test condensers having a different capacity rating, it is only necessary to replace the coils 34, 35 with coils having inductance values which will produce resonance at the same dial points for the harmonics of the same frequencies. The new condensers may now be connected in the circuit one at a time and their conditions observed. The above result may also be obtained by the use of a crystal having different frequency characteristics in the oscillator circuit. Condenser 32 permits use of crystals of different characteristics.

It is evident that a large number of condensers may in this simple manner be quickly and accurately tested, thus insuring the production of accurate condensers.

What is claimed is:

1. The method of testing a variable electric condenser which comprises inserting the condenser in a tuned circuit, generating currents of known fundamental frequency and known higher harmonics of said fundamental, impressing said currents on the tuned circuit including the condenser, so that certain currents have frequencies at spaced intervals within the range of the condenser, varying the setting of the condenser, and ascertaining those points of setting where conditions of resonance for the currents occur.

2. The method of testing a variable electric condenser which comprises inserting the condenser in a tuned circuit including a current indicator, generating strong currents of known fundamental frequency and known higher harmonics of said fundamental, impressing said currents on the tuned circuit, so that certain currents have frequencies at spaced intervals within the range of the condenser, varying the setting of the condenser, ascertaining those points of setting where conditions of resonance for the currents are shown by the current indicator, and noting the deviations of said points from the dial readings for the frequencies of said currents.

3. Apparatus for testing a variable electric condenser comprising means for generating currents of known fundamental frequency and known higher harmonics of said fundamental, a tuned circuit adapted to include the condenser, means for impressing said currents on said circuit and means for indicating conditions of resonance in said circuit.

4. Apparatus for testing a variable electric condenser comprising means for generating currents of known fundamental frequency and known higher harmonics of said fundamental, a tuned circuit adapted to include the condenser, means for impressing said currents on said circuit including coupled coils having inductances designed so that certain currents have frequencies at spaced intervals within the range of the condenser, and means for indicating conditions of resonance in said circuit.

5. Apparatus for testing a variable electric condenser comprising means for generating currents of known fundamental frequency and known higher harmonics of said fundamental, a tuned circuit adapted to include the condenser, means for impressing said currents on said circuit so that certain currents have frequencies at spaced intervals within the range of the condenser, and a current indicator in said circuit.

6. Apparatus for testing a variable electric condenser comprising a tuned circuit adapted to include the condenser, means for indicating conditions of resonance in said circuit, and means for electrically connecting said circuit to an oscillation generator arranged to generate a predetermined fundamental and a plurality of harmonic currents.

7. Apparatus for testing a variable electric condenser comprising means for generating currents of known fundamental frequency and known higher harmonics of said fundamental, and means utilizing said currents for determining the tuning positions of the condenser under test corresponding to the frequencies of certain of said currents.

8. The method of testing a variable electric condenser which comprises generating currents of known fundamental frequency and known higher harmonics of said fundamental, and utilizing said currents for determining the tuning positions of the condenser under test corresponding to the frequencies of certain of said currents.

In testimony whereof, I have hereunto set my hand.

MORRIS H. BENNETT.